United States Patent [19]

Morse

[11] 4,278,491
[45] Jul. 14, 1981

[54] MACHINE FOR MAKING RESIN PANELS

[75] Inventor: Donald B. Morse, Joliet, Ill.

[73] Assignee: Kemlite Corporation, Joliet, Ill.

[21] Appl. No.: 796,674

[22] Filed: May 13, 1977

Related U.S. Application Data

[63] Continuation of Ser. No. 626,105, Oct. 28, 1975, abandoned, which is a continuation of Ser. No. 474,372, May 30, 1974, abandoned.

[51] Int. Cl.³ .............................................. B29B 7/14
[52] U.S. Cl. .................................. 156/501; 156/62.2; 156/62.4; 156/289; 156/543; 156/555; 156/584; 425/335
[58] Field of Search ...................... 156/62.4, 62.2, 276, 156/289, 499, 500, 580, 501, 79, 231, 547, 551, 555, 578, 543, 584; 425/335

[56] References Cited

U.S. PATENT DOCUMENTS

| 2,927,623 | 3/1960 | Huisman et al. ...................... 156/276 |
| 3,047,449 | 7/1962 | Coble ..................................... 156/79 |
| 3,271,215 | 9/1966 | Hoffman .............................. 156/276 |
| 3,630,802 | 12/1971 | Dettling ............................... 156/231 |
| 3,657,032 | 4/1972 | Watanabe et al. ................... 156/62.4 |
| 3,734,814 | 5/1973 | Davis et al. ........................... 156/276 |
| 3,904,336 | 9/1975 | Axer et al. ............................ 425/335 |

Primary Examiner—Jerome W. Massie
Attorney, Agent, or Firm—Carl C. Batz; Edmond T. Patnaude

[57] ABSTRACT

A method of making a resin panel in which a carrier film receives thereon a layer of thermosetting resin and glass fibers are placed on the resin layer. This composite is inverted and passed between a roller and a section of a moving belt, the belt being of a material impermeable to the resin. The resin layer with glass fibers therein is passed through a heating zone to cure the resin while on the belt. After the resin is cured it may be separated from the belt by bending the belt away from the resin.

The machine carries out the above method employing a belt of stainless steel or the like which extends over a pair of rolls to provide a conveyor for the formed resin layer. The machine has a pair of rolls for forming the resin-glass composite. One of these rolls serves to invert the layers and serves also to press the layers against the belt. Heaters are provided to heat the formed resin to cure it while on the belt. One of the rolls which rotate the belt is effective to bend the belt to separate the cured resin layer therefrom.

7 Claims, 2 Drawing Figures

MACHINE FOR MAKING RESIN PANELS

This is a continuation of application Ser. No. 626,105 filed Oct. 28, 1975, now abandoned, which in turn is a continuation of application Ser. No. 474,372 filed May 30, 1974 and now abandoned.

This invention pertains to the manufacture of resin panels and more particularly to glass fiber reinforced resin panels. It deals with improved methods for manufacture of such panels and with improved apparatus for carrying out this manufacture.

BACKGROUND

Resin sheets or panels having glass fiber reinforcements are well known in the construction trades and such panels are widely used in the transportation industry as liners for cars and trucks, in food plants, in dairies, and in other industries where there is need for a strong panel which is unaffected by chemicals and resistant to abrasion.

Such panels have been made by passing a glass fiber mat through a bath of thermosetting resin, encasing the glass fiber mat with resin contained therein between top and bottom films and passing this structure between spaced rolls to squeeze out surplus resin and to gauge the thickness of the resulting sheet, after which the sheet is heated to set the resin. One such manufacture is set forth in the Menzer U.S. Pat. No. 2,980,574; another is set forth in my U.S. Pat. No. 3,480,497 and still another is set forth in Menzer U.S. Pat. No. 3,137,601. Another is set forth in Finger U.S. Pat. No. 2,969,301.

Several difficulties were encountered in the practice of these prior methods. A major difficulty was in getting the glass fibers properly oriented and dispersed in the resin. This difficulty became more critical when using loose cut glass fibers instead of a preformed mat of glass fibers. It appeared that while the glass fibers next to the basic resin layer may be properly impregnated with the resin, the fibers farther removed from the resin layer were likely not to be properly impregnated or to be irregularly impregnated, resulting in a poor quality product.

There is set forth in my copending patent application Ser. No. 259,846 an improved method and apparatus which is addressed to the above mentioned difficulties, and in some respects the present application is a continuation of that application, but it also adds major improvements to the manufacture.

In the prior methods of making such panels it has always been necessary to encase the resin layer on both sides with a protective film such as regenerated cellulose. The sticky characteristics of the resin has dictated that the resin be fully protected before being passed through the forming rolls of the machine. Since the protective films are of no benefit to the finished panel they are removed in the course of manufacture and discarded as waste. It would be of great economic value if one of such films could be eliminated. It would also be an advantage if, after being formed and gauged as to thickness, the panel could remain without movement with respect to the structure which supports it until it is cured, thus to eliminate distortion.

Accordingly, I have set myself to the further improvement of the method and apparatus to accomplish the above mentioned objectives. Other objectives and advantages will become apparent as this specification proceeds.

SUMMARY OF THE INVENTION

I have discovered that the resin layer, preferably together with glass fibers, may be assembled on a film carrier strip and these elements placed on a moving sheet or section of a belt having a surface impervious to the resin, and the moving sheet or belt passed through a heating zone to cure the resin. After the resin is cured I find it may then be separated from the resin impervious sheet or belt as by passing the belt over a roll.

Further, I have found that in the forming of the panel the moving support sheet or section of a belt may itself be passed between a pair of rollers and the film carrier sheet together with the resin and glass fibers passed between these rolls so as to press the resin against the moving resin impervious sheet or belt thus to obtain good impregnation of the fibers and uniform thickness of the panel.

I have further found that the film carrier may be passed along horizontal support while the resin and glass fibers are placed on it, and this film may then together with the resin and glass fibers be inverted before being placed on the belt or being passed between the forming rolls.

These and other improvements will be understood more clearly after the following detailed description.

DETAILED DESCRIPTION

Figure 1:
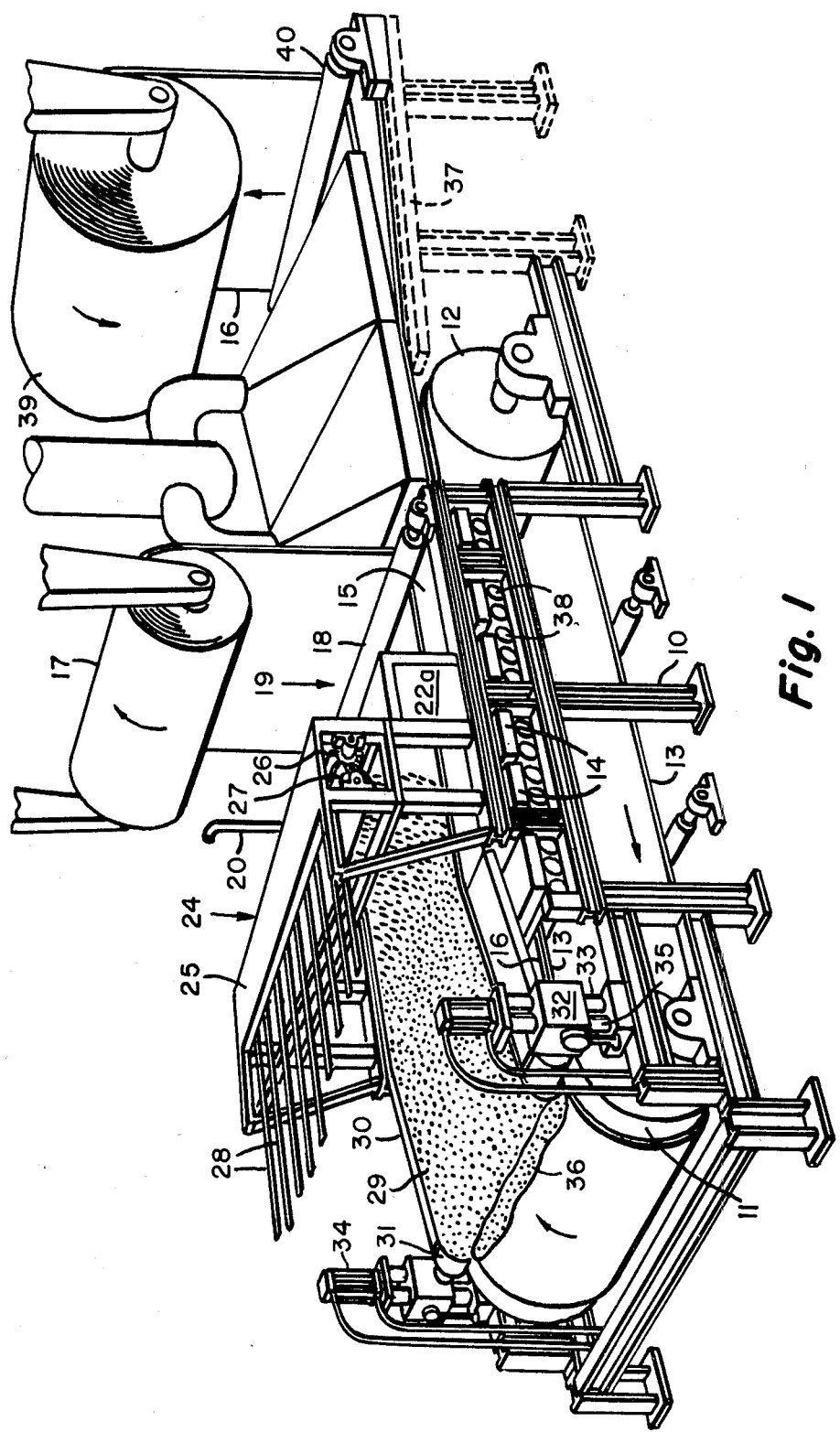
Figure 2:
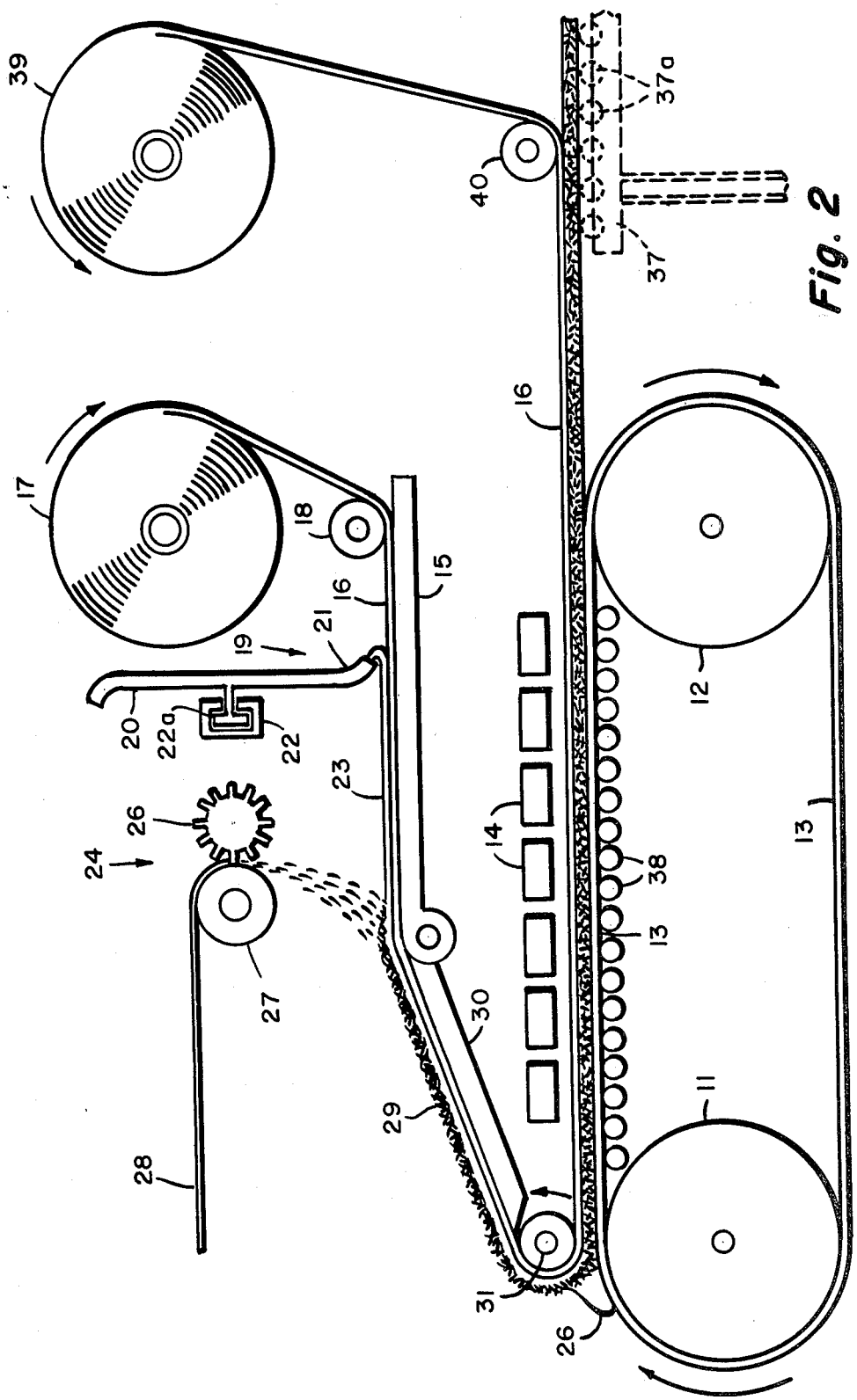

One embodiment of my invention is illustrated by the accompanying drawings in which FIG. 1 is a perspective view of the improved machine; and FIG. 2 is a schematic representation illustrating in somewhat exaggerated dimensions the different layers of material and how they are handled in the improved process.

As illustrated, the machine has a frame 10 in which is mounted the rolls 11 and 12, and about rolls 11 and 12 is an endless belt 13. Spaced above belt 13 are the heaters 14 for the purpose of heating the panel to cure the resin sheet as it passes on belt 13. Heaters of this same character may be installed at a spaced position beneath belt 13 for heating the under side of the panel by heat transmission through the belt. Such heaters below the belt may be in place of or in addition to heaters 14 which are above the belt.

Spaced above the belt and heaters 14 is a substantially horizontal table or platform 15 across which a film carrier is initially passed. The film carrier 16 comes in a roll, and this roll 17 is mounted in any convenient way. It may be mounted in frame 10 of the machine or may be suspended from above as shown in FIG. 1. The film may be a thin sheet of regenerated cellulose such as is commonly called cellophane or may be polyethylene or linear polyester, or any film of this character. The roll 17 may have a suitable clutch and film from this roll may be drawn down and passed under roll 18 so that it lays horizontally on top of platform support 15.

As it is passed forwardly on support 15 it comes under the station 19 and at this station a thermosetting resin is delivered to the top of the film. This resin may be any liquid thermosetting resin. Preferably it is a polyester resin, suitably a mixture of polyester and styrene, and may contain a predetermined proportion of catalysts, fillers and pigments.

The resin is passed through tube 20 to a nozzle 21 which desirably is arranged to move across the sheet and back again to deliver the liquid resin onto the film.

Suitably the pipe 20 or nozzle 21 may be carried within a channel of the cross member 22 inside the enclosure 22a and mechanically moved back and forth across the film as the resin is being delivered. The resin is of a viscosity which allows it to flow into a substantially uniform layer closing the gaps at any small areas not initially struck by the liquid resin issuing directly from the nozzle. The layer of resin thus formed is designated in FIG. 2 by the character 23. As will be seen, this layer lies flat on the film 16 and it passes forwardly in the machine on this film.

When the film 16 with resin layer 23 thereon reaches the station 24 it passes under the glass cutter 25 and receives sprinklings of glass fibers on top of the resin layer. The cutter 25 includes a pair of rolls 26 and 27, roll 26 being equipped with knives. Strands of glass filaments 28 are fed between the rolls 26 and 27, and upon rotation of these rolls toward each other the blades of roll 26 bear against roll 27 to chop the glass strands and allow the fibers to fall in a random distributed fashion down onto the resin layer. Thus there is formed a layer of glass fibers 29, the lowermost of which certainly are imbedded in the resin layer. The fibers when allowed to fall in random fashion become crossed to some degree and somewhat entangled with each other, and not all of them come into contact with the resin at this point. However, they do form a kind of mat which will be held by and travel along with the resin layer. As more clearly shown in FIG. 2 the composite which passes forwardly beyond the glass chopper includes the film carrier 16 on the bottom, the resin layer 23 in the center, and the glass fiber layer 29 on top. Instead of supplying the glass fibers as a sprinkling of such fibers on top a resin layer, a preformed glass mat may instead be put down on top of the resin layer, and this preformed mat passed along with the resin layer forwardly within the machine.

A pivoted platform leaf 30 is provided at the front end of platform 15. This leaf structure is pivoted at its juncture with the platform 15 and extends at an incline toward its front edge. The front edge of this pivoted member is in some appropriate way arranged to move upwardly and downwardly with the roll 31 when this roll is raised or lowered to change the spacing between the rolls 31 and 11.

Rolls 31 and 11 may be considered a pair of rolls which play an important part in the forming of the panel. The roll 31, which may be called a pressure roll, is mounted in frame 10 above roll 11 and spaced above the belt 13 by a distance which is determinative of the thickness of the panel being made. The roll 31 has its ends rotatably held in the heads 32 of the jack devices 33. The arrangement is such that the pneumatic cylinder 34 may be operated very quickly to open or close a substantial space between rolls 31 and 11. When the rolls are closed to a narrow spacing between them there is a further vernier adjustment 35 which may be used to adjust the spacing to make a thicker or a thinner panel. Since the edge of the pivoted support 30 moves along with the head 32 of the jack when the head moves upwardly to raise the roll 31, there is always a smooth passage from the pivoted support 30 onto the roll 31.

As before indicated, the top composite structure composed of the film 16, the resin layer 23 and the glass fiber layer 29 moves forwardly of the machine and down the inclined table leaf 30 to the roll 31. When it reaches roll 31 it proceeds over the top and on the forward side of this roll to a pool of resin 26 in the crotch between rolls 31 and 11. This pool extends substantially across the width of the resin layer. It is fed and maintained by resin from the resin layer 23 and serves an important function in distributing or feeding the resin to local spots where it may be needed to produce complete impregnation of the glass fibers. It is surprising that the pool does not dissipate and drain forwardly down the front of the belt 13, but in operation it is maintained probably by reason of the friction with the belt as the belt moves rearwardly on roll 11.

I find that when using resins of normal viscosity the resin flows out to the side edge of the panel without overflowing, but if it is desired to use resins of lower viscosity I may provide a dam over the edge portion of the panel to prevent wasting resin through overflow.

As the film carrier 16, the resin layer 23 and the glass fibers 29 move rearwardly between rolls 31 and 11 to the nip between the pressure roll 31 and the belt 13, the resin is squeezed thoroughly into the fibers and the thickness of the panel is controlled. The term "nip" is understood to mean points where the space between the roll and the belt is a minimum. The axis of roll 31 should be parallel with roll 11 for producing uniform thickness panels.

The rolls 11 and 12 are positively driven at a predetermined speed and resin is delivered at a controlled rate through pipe 20 so that considering the spacing between the roll 31 and the belt 13 and the speed at which roll 31 is driven, enough resin is laid down to fully supply the need for resin at the nip and in addition maintain the pool of resin 36 forward of the nip.

There has been much hesitancy in the art about placing the sticky resin next to any rolls or machinery, and it is true that the resin does stick tightly to the belt 13 when it strikes it. Were it not for belt 13 the resin would certainly attach itself to the roll 11 and go around this roll to ruin the operation. But the belt 13 receives the resin layer with the glass fibers therein and there is no attempt to remove the resin from its belt support or to move the resin with respect to the belt. The belt moves on rearwardly with the resin sticking tightly to it and comes into proximity with the heaters 14. We may call this area a heating zone.

The belt 13 is preferably of stainless steel suitably a No. 304 or a No. 316 stainless steel, but may be made of any other metal such as high carbon steel which can be made endless and smooth by welding and polishing. Instead of a metal belt I may use certain cured resins such as glass reinforced epoxy resin or silicone resin, or any material which cannot be impregnated or be in any way permeated by the resin used in forming the panel. If the belt is not permeated by the polyester or other thermosetting resin used in forming the panel the resin will stick to the belt to be sure, but when the belt with the resin thereon passes through the heating zone and the resin is cured the relationship changes and thereafter the resin may be separated from the belt.

In the operation of the machine the belt 13 is being continuously rotated through its contact with rotating rolls 11 and 12, and the film carrier, resin and glass fibers are being constantly delivered and placed on a section of the belt, this section constituting a moving sheet. This sheet or section of the belt moves rearwardly of the machine through the heating zone and finally comes to the end of its rearward movement and turns about the roll 12. The belt is bent as it passes over this rear roll. At this point the resin on this section is cured and in a stiffened condition. As the section turns downwardly the resin layer refuses to bend and is passed rearwardly over the rack 37 and moves on away from the machine.

In the foregoing explanation I have used the term "cure" and "cured" to mean that the thermosetting resin has "set" to the extent that the resin is substantially solid and its internal bonds are strong so that it will not easily bend and will separate from the belt as the belt turns away. It may be that after the cured resin passes on along rack 37 further chemical or physical changes of a somewhat different character may take place, but for the purpose of this description these other changes are not contemplated under the term "cure" or "cured" as these terms are used herein.

The section or moving sheet at the top of belt 13 on which the resin layer passes rearwardly of the machine is shown as being horizontal without any substantial sag. If the span of the belt between rolls 11 and 12 is a long one, as it may well need to be in order to accommodate room for the heating zone and for the time necessary to effect a cure of the resin, I prefer to provide support for at least the central portion of the span. Therefore, the rolls 38 are contained in the frame under the upper section of the belt 13. These rolls are free to roll idly as they provide support for the central portion of the belt. Belt flatness is improved if these rolls are disposed in a manner to cause the belt to travel in a slight arc. The radius of the arc should be of the order of 8 to 15 times the distance between the end rolls.

To remove the film carrier sheet 16 from the top of the cured resin panel I provide the roll 39 which may be mounted either in the frame or suspended as shown. It is powered in any suitable way, preferably with a clutch so that the roll is urged to rotate as it may to roll up the film from the top of the panel. A guide roll 40 may be provided to guide the film as it comes off the panel.

The cured resin panel proceeds rearward and as it is extended it comes to rest on the rack 37. Suitably this rack may be provided with transverse rolls 37a which allow the panel to proceed smoothly from the machine.

The heating and curing of the resin releases gases and in the machine illustrated there is provided a hood 41 which extends over the panel rearward of the platform 15 to catch the released gases and discharge them through the conduits 42.

In starting the machine and in any emergency the fluid cylinder 34 may be operated to raise the roll 31 above the belt 13 suitably by several inches to permit free access to the area between roll 31 and belt 13. When the machine is to be put in operation cylinders 34 may be operated in a reverse direction to bring the spacing between the rolls 31 and the belt 13 to a fraction of an inch, and the vernier adjustment 35 regulated to make this spacing correspond with the precise thickness of the panel which is desired. Ordinarily resin impregnated glass fiber panels have a thickness of from 0.040 to 0.250 inches, but thicker or thinner panels can be made when desired.

While only one embodiment of my invention has been illustrated and described in detail with mention of some variations, it is understood that the invention is subject to wide variation and many changes may be made, all within the spirit of the invention, and all such variations and changes are deemed to be included in the scope of the appended claims.

I claim:

1. A machine for making a resin impregnated glass fiber panel comprising a substantially horizontal support, a carrier film on said support, means for depositing on said carrier film a layer of liquid thermosetting resin, means for depositing a layer of glass fibers on said resin whereby the lowermost of the fibers of said glass fiber layer are embedded in said resin thus to form a laminated structure having said film on its one side, a liquid resin layer next to said film and said glass fiber layer on its other side, a pair of spaced rolls, one above the other, an endless belt about the lower roll of said pair, said belt extending between said rolls and being of a material which is impervious to liquid resin, the spacing between said rolls providing a nip therebetween, means for passing said structure along said support across the top of the upper roll of said pair down the side of said upper roll and under said upper roll with its film side next to said upper roll and with its glass fiber layer on the outside, said means being effective also for passing said structure to said nip with its glass fiber layer in contact with said belt to press resin from said resin layer into said glass fiber layer, said structure containing resin in liquid form as it is passed by said means about said upper roll and to said nip, means for heating the resulting structure after it emerges from said nip and while it is on said belt and while it has the same form and thickness as it has when it emerges from said nip, to cure said resin, said resulting structure including said film and a layer of combined resin and glass fibers with said layer of combined resin and glass fibers next to said belt, means including a horizontal section of said belt, for supporting said resulting structure thereon from the time it emerges from said nip until it passes said heating means and said resin is cured, a pivoted leaf support for receiving said structure from said first mentioned support, said pivoted leaf support having its movable end connected with the axis of said upper roll whereby said end may move up and down along said upper roll and about the pivot of said support, and means for elevating or lowering said upper roll with respective said lower roll whereby to adjust the spacing between said rolls and correspondingly to adjust the inclination of said pivoted support.

2. A machine as set forth in claim 1 which includes a pair of rolls which engage and support said belt, one of which is said lower roller.

3. A machine as set forth in claim 2 in which said passing means is effective to pass said structure in one horizontal direction along said support and in the opposite direction through said nip.

4. A machine as set forth in claim 1 which includes means for passing said resulting structure on said belt from said heating means and over the other roll of said last mentioned pair to thereby separate said resulting structure from said belt.

5. A machine as set forth in claim 1 in which said means for passing said structure into said nip includes positively driven means for rotating said last mentioned pair of rolls.

6. A machine as set forth in claim 1 in which the axes of said upper roll and said lower roll are in the same vertical plane.

7. A machine as set forth in claim 1 in which said belt is stainless steel and said lower roll is larger in diameter than said upper roll.

* * * * *